US012705977B2

(12) United States Patent
Tozawa et al.

(10) Patent No.: US 12,705,977 B2
(45) Date of Patent: Aug. 11, 2026

(54) SIGNAL CONTROL SYSTEM, APPARATUS, METHOD, AND COMPUTER-READABLE MEDIUM

(71) Applicant: NEC Corporation, Tokyo (JP)

(72) Inventors: Nobuyuki Tozawa, Tokyo (JP); Satoshi Kimura, Tokyo (JP); Ryota Horiguchi, Tokyo (JP); Morihisa Iijima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 252 days.

(21) Appl. No.: 18/579,173

(22) PCT Filed: Jul. 14, 2021

(86) PCT No.: PCT/JP2021/026516
§ 371 (c)(1),
(2) Date: Jan. 12, 2024

(87) PCT Pub. No.: WO2023/286221
PCT Pub. Date: Jan. 19, 2023

(65) Prior Publication Data
US 2024/0321089 A1 Sep. 26, 2024

(51) Int. Cl.
*G08G 1/00* (2006.01)
*G08G 1/04* (2006.01)
*G08G 1/08* (2006.01)

(52) U.S. Cl.
CPC ................. *G08G 1/08* (2013.01); *G08G 1/04* (2013.01)

(58) Field of Classification Search
CPC .................................. G08G 1/08; G08G 1/04
See application file for complete search history.

(56) References Cited

U.S. PATENT DOCUMENTS 9,396,653 B2 * 7/2016 Ni ............................ G08G 1/07
2013/0018572 A1 * 1/2013 Jang ....................... G08G 1/164
701/119

(Continued)

FOREIGN PATENT DOCUMENTS

JP 04-142700 A 5/1992
JP 2004-199123 A 7/2004

(Continued)

OTHER PUBLICATIONS

International Search Report for PCT/JP2021/026516 dated Oct. 5, 2021 [PCT/ISA/210].

*Primary Examiner* — Truc M Do
(74) *Attorney, Agent, or Firm* — Sughrue Mion, PLLC

(57) ABSTRACT

A first sensor detects a vehicle present in a lane in which a vehicle entering an intersection from a first direction is able to cross an opposite lane and turn right or left, and a vehicle entering the lane. A second sensor measures a flow of traffic of an oncoming vehicle that travels in an opposite lane from a second direction, enters the intersection, and passes through the intersection. Traffic condition acquisition means acquires a traffic condition including a speed of the oncoming vehicle based on sensor information obtained from the second sensor. Traffic light control means controls a timing of a signal indication for facilitating the right turn or the left turn in signal indications of a first traffic light and a second traffic light, based on sensor information obtained from the first sensor and the acquired traffic condition.

16 Claims, 10 Drawing Sheets

(56) References Cited

U.S. PATENT DOCUMENTS

| | | | | |
|---|---|---|---|---|
| 2013/0179025 | A1* | 7/2013 | Deng | B60W 50/0098 701/23 |
| 2016/0027300 | A1* | 1/2016 | Raamot | G08G 1/0145 340/922 |
| 2016/0155334 | A1* | 6/2016 | Jansson | G08G 1/07 340/906 |
| 2017/0330456 | A1* | 11/2017 | Miller | G08G 1/096758 |
| 2018/0096595 | A1* | 4/2018 | Janzen | G06V 10/94 |
| 2018/0281803 | A1* | 10/2018 | Mukai | B60W 30/18154 |
| 2019/0018419 | A1* | 1/2019 | Lee | B60W 30/181 |
| 2019/0355245 | A1* | 11/2019 | Gigengack | B60W 40/04 |
| 2020/0026284 | A1* | 1/2020 | Hiramatsu | G08G 1/0125 |
| 2020/0111351 | A1* | 4/2020 | Vadlamani | G08G 1/042 |
| 2020/0135019 | A1* | 4/2020 | Hirotsu | G08G 1/08 |
| 2022/0068124 | A1* | 3/2022 | Kobashi | G08G 1/056 |

FOREIGN PATENT DOCUMENTS

| | | | |
|---|---|---|---|
| JP | 2007-328454 | A | 12/2007 |
| JP | 2012-133760 | A | 7/2012 |

* cited by examiner

SIGNAL CONTROL SYSTEM, APPARATUS, METHOD, AND COMPUTER-READABLE MEDIUM

CROSS REFERENCE TO RELATED APPLICATIONS

This application is a National Stage of International Application No. PCT/JP2021/026516 filed Jul. 14, 2021.

TECHNICAL FIELD

The present disclosure relates to a signal control system, an apparatus, a method, and a computer-readable medium.

BACKGROUND ART

As a related art, Patent Literature 1 discloses a traffic light automatic time adjustment system. In the traffic light automatic time adjustment system, a vehicle sensing device detects a traffic jam of right-turning vehicles on a right-turning lane. When the traffic jam is detected in the right-turning lane, a processing control device automatically extends the display time of a right-turn signal by a predetermined adjustment time. In addition, the processing control device uses a vehicle sensor disposed at an exit of the opposite lane in a direction of traveling straight at an intersection to detect congestion in the opposite lane. When the exit of the opposite lane in the direction of traveling straight at the intersection is congested, a vehicle traveling straight on the opposite lane cannot enter the intersection. When the opposite lane is congested, the processing control device advances a timing of issuing the right-turn signal more than usual.

CITATION LIST

Patent Literature

Patent Literature 1: Japanese Unexamined Patent Application Publication No. 2004-199123

SUMMARY OF INVENTION

Technical Problem

In the traffic light automatic time adjustment system disclosed in Patent Literature 1, when the opposite lane is congested, it is possible to flexibly resolve the traffic congestion of the right-turning lane by advancing the timing of issuing the right-turn signal more than usual. However, in Patent Literature 1, the speed of an oncoming straight-traveling vehicle entering the intersection is not considered in the signal control. Therefore, the traffic light automatic time adjustment system disclosed in Patent Literature 1 may not enable a right-turning vehicle to start right turning at an appropriate timing for both an oncoming straight-traveling vehicle and the right-turning vehicle.

In view of the above circumstances, an object of the present disclosure is to provide a signal control system, an apparatus, a method, and a computer-readable medium capable of improving accuracy of signal control.

Solution to Problem

In order to achieve the above object, a first aspect of the present disclosure provides a signal control apparatus. The signal control apparatus includes a first sensor configured to detect a vehicle present in a lane in which a vehicle entering an intersection at which a traffic light is installed from a first direction is able to cross an opposite lane and turn right or left, and a vehicle entering the lane, a second sensor configured to measure a flow of traffic of an oncoming vehicle that travels in an opposite lane from a second direction opposite to the first direction, enters the intersection, and passes through the intersection, traffic condition acquisition means for acquiring a traffic condition including a speed of the oncoming vehicle based on sensor information obtained from the second sensor, and traffic light control means for controlling signal indications of first and second traffic lights which control which control traffic of vehicles entering the intersection from the first direction and the second direction. The signal indication includes a signal indication for facilitating the right turn or the left turn, and the traffic light control means controls a timing of the signal indication for facilitating the right turn or the left turn based on sensor information obtained from the first sensor and the traffic condition.

A second aspect of the present disclosure provides a signal control system. The signal control system includes a first traffic light configured to control traffic of a vehicle entering an intersection from a first direction, a second traffic light configured to control traffic of a vehicle entering the intersection from a second direction opposite to the first direction, and a signal control apparatus configured to control the first traffic light and the second traffic light. The signal control apparatus includes a first sensor configured to detect a vehicle present in a lane in which a vehicle entering the intersection from the first direction is able to cross an opposite lane and turn right or left, and a vehicle entering the lane, a second sensor configured to measure a flow of traffic of an oncoming vehicle that travels in an opposite lane from the second direction, enters the intersection, and passes through the intersection, traffic condition acquisition means for acquiring a traffic condition including a speed of the oncoming vehicle based on sensor information obtained from the second sensor, and traffic light control means for controlling signal indications of the first traffic light and the second traffic light. The signal indication includes a signal indication for facilitating the right turn or the left turn, and the traffic light control means controls a timing of the signal indication for facilitating the right turn or the left turn based on sensor information obtained from the first sensor and the traffic condition.

A third aspect of the present disclosure provides a signal control method. The signal control method includes detecting a vehicle present in a lane in which a vehicle entering an intersection at which a traffic light is installed from a first direction is able to cross an opposite lane and turn right or left, and a vehicle entering the lane, measuring a flow of traffic of an oncoming vehicle that travels in the opposite lane from a second direction opposite to the first direction, enters the intersection, and passes through the intersection, acquiring a traffic condition including a speed of the oncoming vehicle based on the measured flow of the traffic of the oncoming vehicle, and controlling a timing of a signal indication for facilitating the right turn or the left turn in controlling signal indications of first and second traffic lights configured to control traffic of vehicles entering the intersection from the first direction and the second direction, based on detection results of the vehicle present in the lane and the vehicle entering the lane and the acquired traffic condition.

A fourth aspect of the present disclosure provides a computer-readable medium. The computer-readable medium stores a program for causing a computer to execute a process including detecting a vehicle present in a lane in which a vehicle entering an intersection at which a traffic light is installed from a first direction is able to cross an opposite lane and turn right or left, and a vehicle entering the lane, measuring a flow of traffic of an oncoming vehicle that travels in the opposite lane from a second direction opposite to the first direction, enters the intersection, and passes through the intersection, acquiring a traffic condition including a speed of the oncoming vehicle based on the measured flow of the traffic of the oncoming vehicle, and controlling a timing of a signal indication for facilitating the right turn or the left turn in controlling signal indications of first and second traffic lights configured to control traffic of vehicles entering the intersection from the first direction and the second direction, based on detection results of the vehicle present in the lane and the vehicle entering the lane and the acquired traffic condition.

Advantageous Effects of Invention

The signal control system, the apparatus, the method, and the computer-readable medium according to the present disclosure can improve accuracy of signal control.

EXAMPLE EMBODIMENTS

Figure 1:
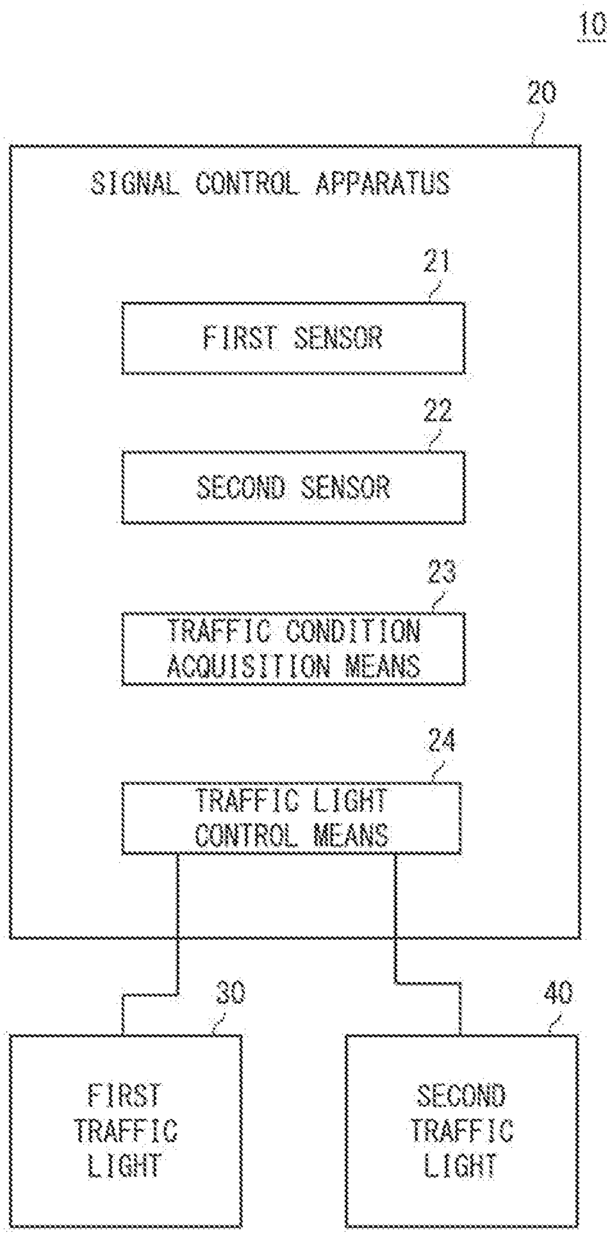
FIG. 1 is a block diagram illustrating a schematic configuration of a signal control system according to the present disclosure.

Prior to describing example embodiments according to the present disclosure, an outline of the present disclosure will be described. FIG. 1 illustrates a schematic configuration of a signal control system according to the present disclosure. A signal control system 10 includes a signal control apparatus 20, a first traffic light 30, and a second traffic light 40. The first traffic light 30 controls traffic of a vehicle entering an intersection from a first direction. The second traffic light 40 controls traffic of a vehicle entering the same intersection from a second direction. The second direction is a direction opposite to the first direction. The signal control apparatus 20 controls signal indications of the first traffic light 30 and the second traffic light 40.

The signal control apparatus 20 includes a first sensor 21, a second sensor 22, traffic condition acquisition means 23, and traffic light control means 24. The first sensor 21 detects a vehicle present in a lane in which a vehicle entering an intersection from the first direction can cross an opposite lane and turn right, and a vehicle entering the lane. The second sensor 22 measures a flow of traffic of an oncoming vehicle that travels in an opposite lane and enters the intersection from the second direction, and passes through the intersection. The second sensor 22 measures, for example, the flow of traffic of an oncoming vehicle on a road on the upstream side of the intersection. The oncoming vehicle includes, for example, a vehicle that turns left or travels straight at the intersection.

The traffic condition acquisition means 23 acquires a traffic condition including the speed of the oncoming vehicle that travels straight or turns left at the intersection on the opposite lane, based on sensor information obtained from the second sensor 22. The traffic light control means 24 controls signal indications of the first traffic light 30 and the second traffic light 40. The signal indications of the first traffic light 30 and the second traffic light 40 include a signal indication for facilitating right turn of a vehicle entering the intersection from the first direction at the intersection. The traffic light control means 24 controls the timing of the signal indication for facilitating the right turn based on the sensor information obtained from the first sensor 21 and the traffic condition acquired by the traffic condition acquisition means 23.

In the present disclosure, the traffic condition acquisition means 23 acquires the traffic condition including the speed of the oncoming vehicle viewed from a right-turning vehicle. The traffic light control means 24 controls the timing of the signal indication for facilitating the right turn according to the traffic condition of the oncoming vehicle, which includes the speed. For example, it is assumed that the oncoming vehicle is traveling at a position away from the intersection by a certain distance. In this case, if the traveling speed of the oncoming vehicle changes, it is considered that the timing at which the oncoming vehicle passes through the intersection changes, and the timing of the signal indication for facilitating the right turn, which is suitable for the right-turning vehicle and the oncoming vehicle, changes. In the present disclosure, since the speed of the oncoming vehicle is taken into consideration in the signal control, it is possible to perform the signal indication for facilitating the right turn at an appropriate timing, and to improve the accuracy of the signal control.

The example embodiments according to the present disclosure will be described hereinafter in detail with reference to the drawings. Note that in the description and drawings below, omission and simplification are made as appropriate, for clarity of description. In addition, in each of the drawings, the same elements and similar elements are denoted by the same reference signs, and a duplicate description is omitted as necessary. In the following, it is assumed that a vehicle travels on the left side of a road. When a vehicle travels on the right side of a road, the right turn and the left turn may be appropriately switched.

Figure 2:
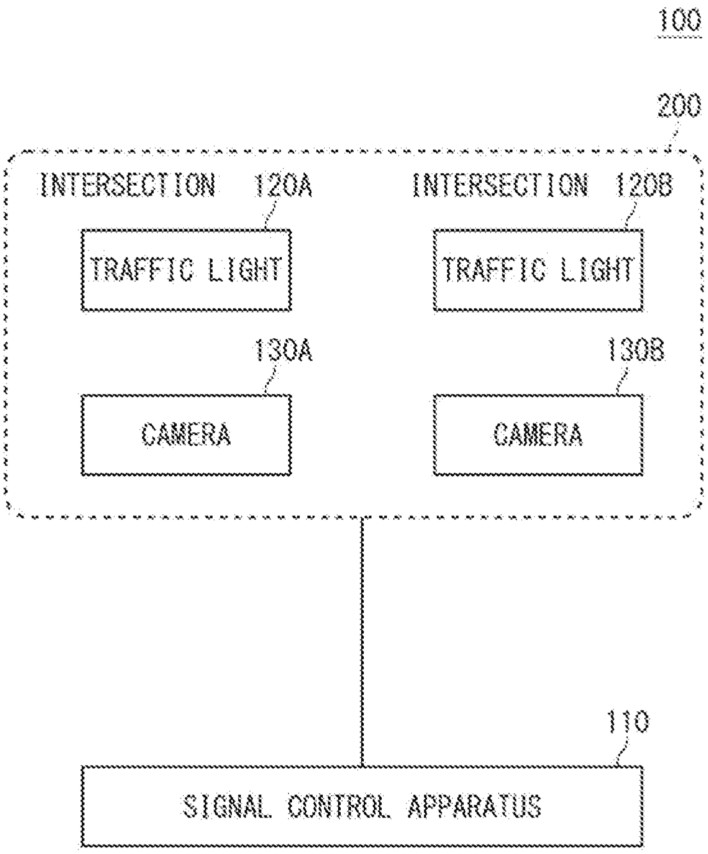
FIG. 2 is a block diagram illustrating a signal control system according to a first example embodiment of the present disclosure.

FIG. 2 illustrates a signal control system according to a first example embodiment of the present disclosure. A signal control system 100 includes a signal control apparatus 110, traffic lights 120A and 120B, and cameras 130A and 130B. The traffic lights 120A and 120B and cameras 130A and 130B are disposed at an intersection 200. Note that the number of traffic lights and cameras disposed at the intersection 200 is not limited to two. Three or more traffic lights and cameras may be disposed at the intersection 200. The signal control system 100 corresponds to the signal control system 10 illustrated in FIG. 1.

The intersection 200 is assumed to be, for example, a four-way road in which a pair of roads extending in one direction intersect a pair of roads extending in the other direction. The traffic light 120A controls passage of a vehicle that travels on a road extending in one direction and enters the intersection 200 from the first direction. The traffic light 120B controls passage of a vehicle that travels on a road extending in one direction and enters the intersection 200 from the second direction opposite to the first direction. Each of the traffic lights 120A and 120B has lights of green, yellow, and red. Further, each of the traffic lights 120A and 120B may have a right-turn arrow signal. The traffic light 120A corresponds to the first traffic light 30 illustrated in FIG. 1, and the traffic light 120B corresponds to the second traffic light 40 illustrated in FIG. 1. In the following description, the traffic lights 120A and 120B are also referred to as traffic lights 120 when there is no need to distinguish between the traffic lights 120A and 120B.

The camera 130A is an image capturing device that captures an image of a road in which a vehicle enters the intersection 200 from the first direction. In particular, the camera 130A captures an image of a lane in which a right-turning vehicle travels in a road in which the vehicle enters the intersection 200 from the first direction. The camera 130B is an image capturing device that captures an image of a road in which a vehicle enters the intersection 200 from the second direction. In particular, the camera 130B captures an image of a lane in which a straight-traveling vehicle and a left-turning vehicle travel in a road in which the vehicle enters the intersection 200 from the second direction. In the following description, the cameras 130A and 130B are also referred to as cameras 130 when there is no need to distinguish between the cameras 130A and 130B.

The signal control apparatus 110 acquires an image from the camera 130 installed at the intersection 200. In addition, the signal control apparatus 110 controls the signal indication of the traffic light 120 at the intersection 200. The signal control apparatus 110 is connected to the traffic light 120 and the camera 130 via, for example, at least one of a wired communication network and a wireless communication network. The signal control apparatus 110 is disposed, for example, in a data center far away from the intersection 200. The signal control apparatus 110 may be connected to the traffic light 120 and the camera 130 installed at a plurality of intersections. The signal control apparatus 110 may be installed at the intersection 200. The signal control apparatus 110 corresponds to the signal control apparatus 20 illustrated in FIG. 1.

Figure 3:
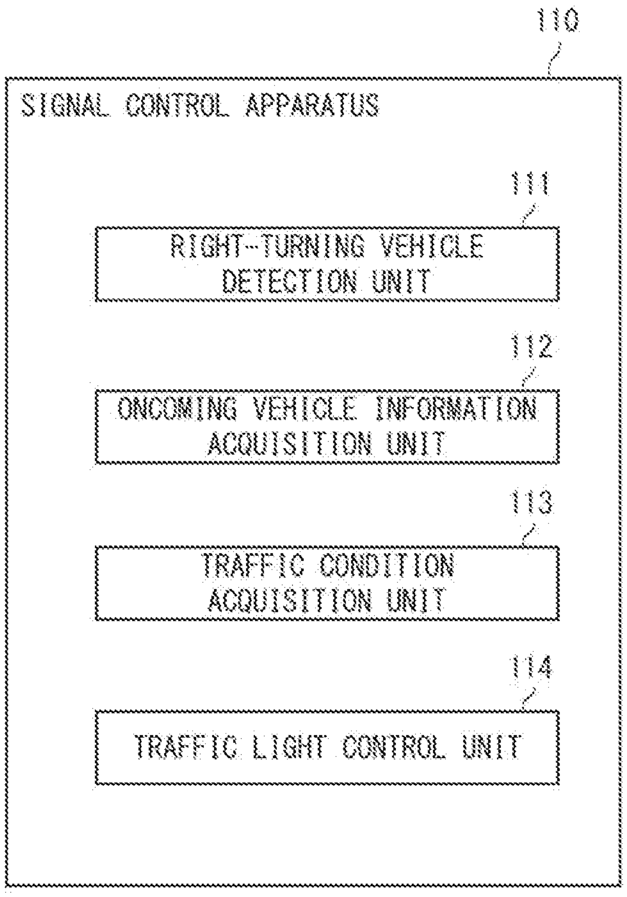
FIG. 3 is a block diagram illustrating an example of a configuration of a signal control apparatus.

FIG. 3 illustrates an example of a configuration of the signal control apparatus 110. The signal control apparatus 110 includes a right-turning vehicle detection unit 111, an oncoming vehicle information acquisition unit 112, a traffic condition acquisition unit 113, and a traffic light control unit 114. The signal control apparatus 110 is configured as, for example, a computer apparatus such as a server. At least a part of the function of each unit in the signal control apparatus 110 can be realized by the computer apparatus operating according to a program.

The right-turning vehicle detection unit 111 detects a vehicle present in a lane in which a vehicle entering the intersection 200 from the first direction can cross an opposite lane and turn right, and a vehicle entering the lane. The right-turning vehicle detection unit 111 detects a vehicle present in a lane in which the vehicle can turn right and a vehicle entering a lane in which the vehicle can turn right, from an image acquired from the camera 130A (first image capturing device), for example. The right-turning vehicle detection unit 111 is configured as an artificial intelligence (AI) sensor that receives an image as an input and outputs a detection result, for example. The AI sensor includes, for example, a neural network such as a convolutional neural network (CNN). The right-turning vehicle detection unit 111 corresponds to the first sensor 21 illustrated in FIG. 1.

The oncoming vehicle information acquisition unit 112 measures the flow of traffic of the oncoming vehicle that travels in the opposite lane, enters the intersection 200 from the second direction, and turns left or travels straight at the intersection 200. The oncoming vehicle information acquisition unit 112 measures the flow of traffic of the oncoming vehicle from, for example, an image acquired from the camera 130B (second image capturing device). The oncoming vehicle information acquisition unit 112 measures, for example, the position and the speed of the oncoming vehicle. The oncoming vehicle information acquisition unit 112 is configured as an AI sensor that receives an image as an input and outputs a measurement result, for example. The AI sensor includes, for example, a neural network such as a CNN. The oncoming vehicle information acquisition unit 112 corresponds to the second sensor 22 illustrated in FIG. 1.

The traffic condition acquisition unit 113 acquires the traffic condition including the speed of the oncoming vehicle based on information measured by the oncoming vehicle information acquisition unit 112. The traffic condition acquisition unit 113 acquires, for example, an intersection entry time indicating a time until the oncoming vehicle reaches the intersection 200, as the traffic condition of the oncoming vehicle. The traffic condition acquisition unit 113 calculates the intersection entry time based on, for example, the speed of the oncoming vehicle and the distance from the oncoming vehicle to the intersection 200 (the stop line thereof). The traffic condition acquisition unit 113 predicts an intersection entry time point at which the oncoming vehicle enters the intersection 200, based on the intersection entry time. The intersection entry time point can be predicted from the current time point and the intersection entry time. The traffic condition acquisition unit 113 corresponds to the traffic condition acquisition means 23 illustrated in FIG. 1.

The traffic light control unit 114 controls the signal indications of the traffic lights 120A and 120B, and controls the passage of vehicles entering the intersection 200 from the first direction and the second direction. The signal indications of the traffic lights 120A and 120B include a signal indication for facilitating right turn. The signal indication for facilitating the right turn can also be rephrased as a signal indication that enables a right-turning vehicle to safely turn right at an intersection. The traffic light control unit 114 controls a timing to start the signal indication for facilitating the right turn, based on the detection result of the right-turning vehicle detection unit 111 and the traffic condition of the oncoming vehicle acquired by the traffic condition acquisition unit 113. The traffic light control unit 114 may control the timing of the signal indication for facilitating the right turn without changing the overall time of a signal indication cycle.

The traffic light control unit 114 may perform a time difference indication between the traffic light 120A (first direction) and the traffic light 120B (second direction) in the signal indication for facilitating the right turn. The time difference indication means, for example, indications in which the lengths of periods during which a vehicle can travel in a straight-traveling direction in both directions are different from each other. In the present example embodiment, in the time difference indication, the length of the period in which the vehicle can travel in the straight-traveling direction in the first direction is set to be longer than the length of the period in which the vehicle can travel in the straight-traveling direction in the second direction. The traffic light control unit 114 corresponds to the traffic light control means 24 illustrated in FIG. 1.

Figure 4:
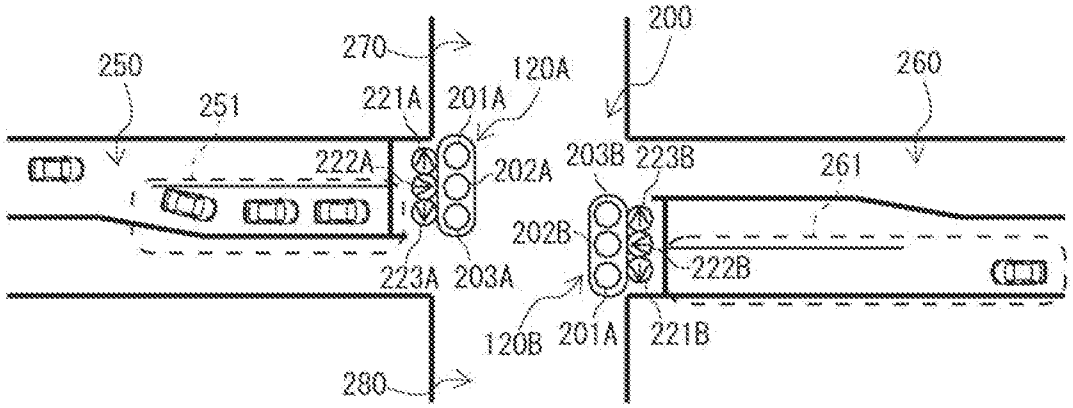
FIG. 4 is a plan view schematically illustrating an example of an arrangement of traffic lights at an intersection.

FIG. 4 illustrates an example of an arrangement of the traffic lights 120 at the intersection 200. The intersection 200 is assumed to be a four-way road in which roads 250 and 260 intersect roads 270 and 280. In FIG. 4, the traffic light 120A controls passage of a vehicle entering the intersection 200 from the road 250. The traffic light 120B controls passage of a vehicle entering the intersection 200 from the road 260. The first direction is a direction from the road 250 to the intersection 200, and the second direction is a direction from the road 260 to the intersection 200. Although not illustrated in FIG. 4, a pair of traffic lights for controlling passage of vehicles entering the intersection 200 from the roads 270 and 280 are also disposed at the intersection 200.

The traffic light 120A has a green signal light 201A, a yellow signal light 202A, and a red signal light 203A. The traffic light 120A further includes a left-turn arrow signal light 221A, a straight arrow signal light 222A, and a right-turn arrow signal light 223A. The traffic light 120B has a green signal light 201B, a yellow signal light 202B, and a red signal light 203B. The traffic light 120B further includes a left-turn arrow signal light 221B, a straight arrow signal light 222B, and a right-turn arrow signal light 223B. The cameras 130A and 130B (see FIG. 2), which are not illustrated in FIG. 4, capture images of the roads 250 and 260, respectively. The camera 130A may be attached to the traffic light 120A, and the camera 130B may be attached to the traffic light 120B.

The right-turning vehicle detection unit 111 (see FIG. 3) of the signal control apparatus 110 detects a vehicle present in a right-turning lane area 251 on the road 250 and a vehicle entering the right-turning lane area 251, from an image captured by the camera 130A. The right-turning vehicle detection unit 111 may detect a vehicle present in the right-turning lane area 251 and a vehicle entering the right-turning lane area 251 by using images captured by a plurality of cameras. The oncoming vehicle information acquisition unit 112 measures the flow of traffic of the oncoming vehicle present in a monitoring target area 261 including a lane in which the vehicle can travel straight and turn left at the intersection 200 on the road 260, from an image captured by the camera 130B. The oncoming vehicle information acquisition unit 112 may measure the flow of traffic of the oncoming vehicle present in the monitoring target area 261 by using images captured by a plurality of cameras. The traffic condition acquisition unit 113 predicts the intersection entry time point for each vehicle present in the monitoring target area 261. The intersection entry time point indicates, for example, the time point at which each vehicle reaches the stop line before the intersection 200.

For example, the traffic light control unit 114 allows traffic in a right-turning direction to proceed at the traffic light 120A, and prohibits traffic in a left-turning direction and the straight-traveling direction at the traffic light 120B, thereby performing the signal indication for facilitating the right turn. The traffic light control unit 114 may perform the signal indication for facilitating the right turn by turning on the right-turn arrow signal light 223A at the traffic light 120A and turning on the red signal light 203B at the traffic light 120B. The traffic light control unit 114 may allow traffic in the straight-traveling direction to proceed at the traffic light 120A during at least a part of a period in which the signal indication for facilitating the right turn is performed. The traffic light control unit 114 controls the timing to start the signal indication for facilitating the right turn, based on the detection result of the right-turning vehicle detection unit 111 and the intersection entry time point of each vehicle predicted by the traffic condition acquisition unit 113.

For example, the traffic light control unit 114 starts, in a normal operation, the signal indication for facilitating the right turn at a predetermined timing defined in the signal indication cycle. The traffic light control unit 114 may control the timing of the signal indication for facilitating the right turn according to the intersection entry time point of the oncoming vehicle predicted by the traffic condition acquisition unit 113 and the time point corresponding to the predetermined timing in the signal indication cycle. For example, the traffic light control unit 114 determines, based on the predicted intersection entry time point, whether or not there is an oncoming vehicle entering the intersection 200 from the road 260 until the time point corresponding to the predetermined timing. Upon determining that there is no such oncoming vehicle, the traffic light control unit 114 causes the traffic light 120B to turn red in the straight-traveling direction and the left-turning direction at a timing earlier than the predetermined timing, and starts the signal indication for facilitating the right turn from the road 250 to the road 280.

Figure 5:
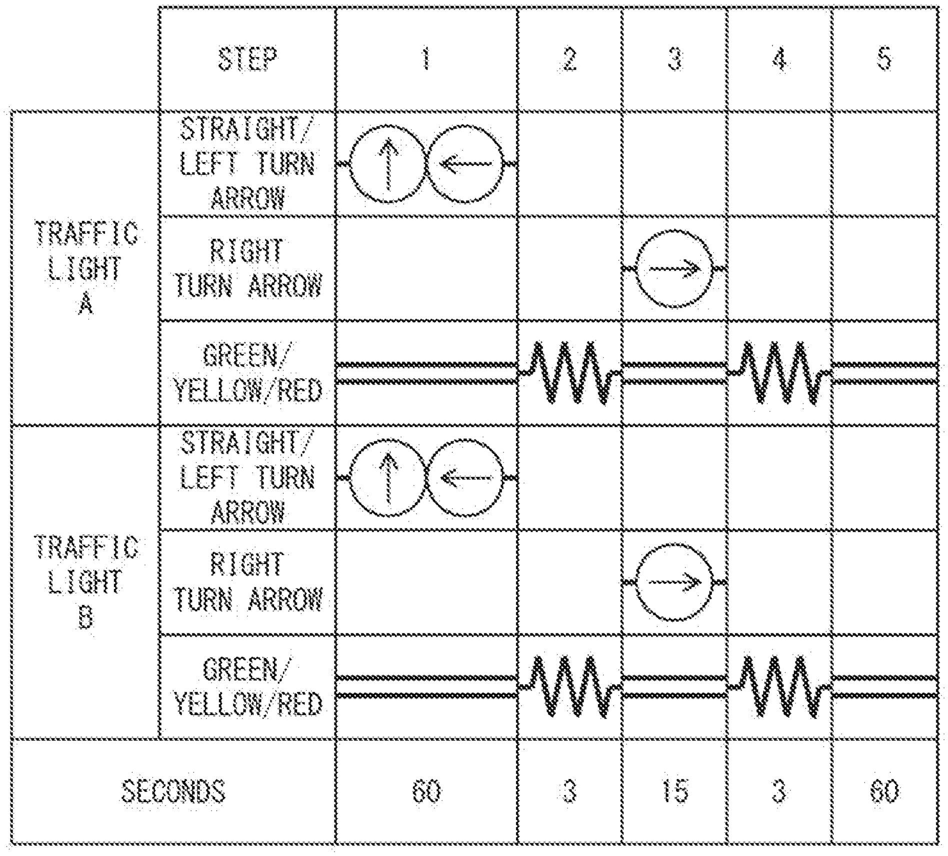
FIG. 5 is an indication step diagram illustrating a typical signal indication cycle for separating right-turning vehicles from straight-traveling vehicles and left-turning vehicles.

Here, an example of the signal indication cycle at the intersection 200 will be described. FIG. 5 illustrates an indication step of a typical signal indication for separating right-turning vehicles from straight-traveling vehicles and left-turning vehicles. In FIG. 5, a traffic light A corresponds to the traffic light 120A illustrated in FIG. 4, and a traffic light B corresponds to the traffic light 120B illustrated in FIG. 4. "Straight/left turn arrow" indicates lighting states of the left-turn arrow signal lights 221A and 221B and the straight arrow signal lights 222A and 222B. "Right turn arrow" indicates lighting states of the right-turn arrow signal lights 223A and 223B. "Green/yellow/red" represents lighting states of the green signal lights 201A and 201B, the yellow signal lights 202A and 202B, and the red signal lights 203A and 203B. In "green/yellow/red", the double line indicates a red signal, and the oblique line indicates a yellow signal.

In FIG. 5, the signal indication in step 1 is a signal indication in which, in each of the traffic lights 120A and 120B, the passage is allowed in the straight-traveling direction and the left-turning direction and is not allowed in the right-turning direction. In step 1, the red signal lights 203A and 203B are turned on, and the left-turn arrow signal lights 221A and 221B and the straight arrow signal lights 222A and 222B are turned on. The signal indication in step 2 is yellow. In step 2, the yellow signal lights 202A and 202B are turned on.

The signal indication in step 3 is a signal indication in which, in each of the traffic lights 120A and 120B, the passage is not allowed in the straight-traveling direction and the left-turning direction, and is allowed in the right-turning direction. In step 3, the red signal lights 203A and 203B are turned on, and the right-turn arrow signal lights 223A and 223B are turned on. The timing of transition from step 2 to step 3 corresponds to a start timing of the signal indication for facilitating the right turn. The signal indication in step 4 is yellow. In step 4, the yellow signal lights 202A and 202B are turned on. The signal in step 5 is a signal indication in which the passage is not allowed in the straight-traveling direction, the left-turning direction, and the right-turning direction. In step 5, the red signal lights 203A and 203B are turned on.

In the signal indication cycle, for example, the duration of step 1 is set to 60 seconds, and the duration of step 2 is set to 3 seconds. Also, for example, the duration of step 3 is 15 seconds, the duration of step 4 is 3 seconds, and the duration of step 4 is set to 60 seconds. The period of step 5 includes a period in which the green signal, the yellow signal, and the red signal are controlled in the directions of the roads 270 and 280 intersecting the roads 250 and 260. After the traffic light turns red in the directions of the roads 270 and 280, the signal indication cycle returns to step 1.

The signal indication for separating the right-turning vehicles from the straight-traveling vehicles and the left-turning vehicles described above is useful for preventing an accident between the right-turning vehicle and the straight-traveling vehicle. However, even when there is no oncoming straight-traveling vehicle entering the intersection 200 from the road 260, the vehicle intended to turn right from the road 250 to the road 280 needs to wait until the right-turn arrow signal light 223A is turned on in step 3. When the vehicle stays in a right-turning lane while waiting for the right turn and thus the number of vehicles exceeds the capacity of the lane, traveling of a straight-traveling vehicle intended to travel straight from the road 250 to the road 260 is interrupted by the vehicle waiting for the right turn, and a traffic jam occurs.

In Patent Literature 1, when the traffic jam is detected in the right-turning lane, a processing control device automatically extends the display time of a right-turn signal by a predetermined adjustment time. In this case, by extending the duration of step 3, it is possible to increase the number of vehicles that can complete the right turn at the intersection. However, in Patent Literature 1, even when there is no straight-traveling vehicle on the opposite lane, a right-turning vehicle needs to wait in a right-turning lane more than necessary for a predetermined time, and the right-turning lane is likely to stay. An object of the present example embodiment is to at least alleviate the above problem by controlling the timing of the signal indication for facilitating the right turn according to the traffic condition including the speed on the opposite lane side.

Figure 6:
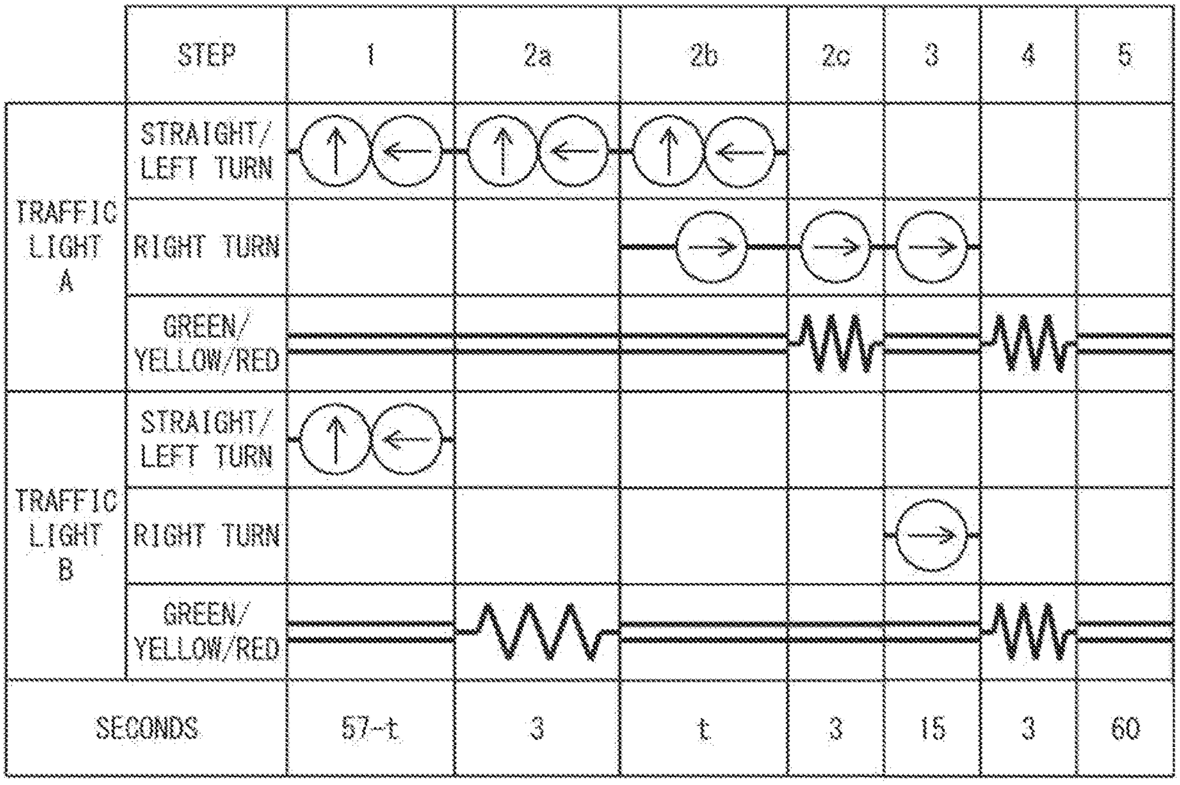
FIG. 6 is an indication step diagram illustrating an example of a signal indication cycle used in the present example embodiment.

FIG. 6 illustrates an example of the signal indication cycle used in the present example embodiment. Step 1 and steps 3 to 5 may be the same as those in FIG. 5. In FIG. 6, step 2*a* is a step of allowing passage of a straight-traveling vehicle and a left-turning vehicle at the traffic light 120A following step 1, and setting the traffic light 120B to turn yellow. Step 2*b* is a step of allowing the right turn at the traffic light 120B in addition to the straight traveling and left turn and setting the traffic light 120A to turn red. Step 2*c* is a step of allowing only the right turn at the traffic light 120A and setting the traffic light 120A to turn yellow in the straight-traveling direction and the left-turning direction.

In the present example embodiment, while performing the signal indication of step 1, the traffic light control unit 114 determines whether or not to advance the timing to start the signal indication for facilitating the right turn, based on the intersection entry time point of the oncoming straight-traveling vehicle predicted by the traffic condition acquisition unit 113. Upon determining not to advance the timing, the traffic light control unit 114 controls the traffic light 120A and the traffic light 120B to turn yellow at a time point after 60 seconds from the start of step 1, according to the signal indication cycle illustrated in FIG. 5. Upon determining to advance the timing, the traffic light control unit 114 shifts the step from step 1 to step 2*a* illustrated in FIG. 6 at a time point before the time point after 60 seconds from the start of step 1.

Figure 7:
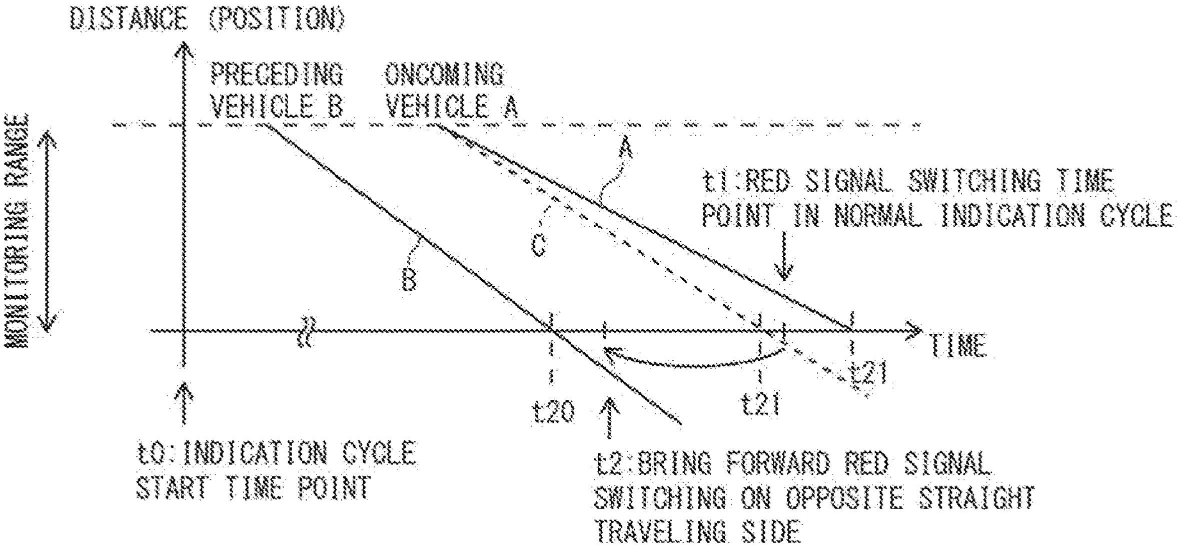
FIG. 7 is a time-space diagram illustrating a relationship between a position of an oncoming vehicle and a time.

FIG. 7 illustrates a relationship between the position of the oncoming vehicle and the time. In the time-space diagram illustrated in FIG. 7, the vertical axis represents the distance to the intersection (stop line), and the horizontal axis represents the time. A time point t0 represents the start time point of the signal indication cycle, that is, the start time point of step 1 in FIG. 5. A time point t1 represents a red signal switching time point on the opposite straight traveling side in a normal signal indication cycle, that is, a time point for transition from step 2 to step 3 in FIG. 5. In the example of FIG. 5, the time point t1=the time point t0+63 seconds.

The traffic condition acquisition unit 113 sets a range from, for example, an intersection to a point of 100 m ahead of the intersection as the monitoring target area 261 (see FIG. 4) in the oncoming straight lane, and predicts the intersection entry time point for each vehicle in the monitoring target area 261. The traffic condition acquisition unit 113 tracks each vehicle in the monitoring target area 261 and updates the intersection entry time point of each vehicle as needed. For example, the traffic condition acquisition unit 113 predicts that the oncoming vehicle A entering the monitoring target area 261 enters the intersection 200 at a time point t21 as indicated by the graph A in FIG. 7. It is assumed that the time point t21 is a time point after the time point t1. In this case, when the traffic light 120B does not allow passage on the straight traveling side at the time point t1, the oncoming vehicle A cannot pass through the intersection 200 and stops before the intersection 200.

The traffic condition acquisition unit 113 predicts that the preceding vehicle B immediately before the oncoming vehicle A enters the intersection 200 at a time point t20 as indicated by the graph B. In this case, even if the traffic light 120B does not allow passage on the straight traveling side at any timing during a period from the time point t20 when the preceding vehicle B passes through the intersection 200 and the time point t1, traffic on the opposite lane side is not affected. In other words, even if the traffic light 120B does not allow passage on the straight traveling side at any time point during a period after the time point t20 and before the time point t1, the number of oncoming straight-traveling vehicles that can pass through the intersection 200 does not change.

In the present example embodiment, when there is no oncoming vehicle entering the intersection 200 until the time point t1, the traffic light control unit 114 determines to advance the timing of the signal indication for facilitating the right turn. In this case, the traffic light control unit 114 determines how much the signal indication for facilitating the right turn is advanced based on the time difference between the intersection entry time point t20 of the oncoming vehicle B that finally enters the intersection 200 in the period up to the time point t1 and the time point t1. For example, the traffic light control unit 114 determines the time point t2 immediately after the time point t20 as the time point at which the traffic light 120B does not allow passage on the straight traveling side. If the speed of the oncoming vehicle A is high and the oncoming vehicle A can enter the intersection at a time point before the time point t1 as indicated by the graph C, the traffic light control unit 114 determines that the timing of the signal indication for facilitating the right turn is not advanced from the time point t1.

When the traffic light control unit 114 determines to advance the timing of the signal indication for facilitating the right turn, in step 2*a* of FIG. 6, the traffic light control unit 114 allows passage at the traffic light 120A in the straight-traveling direction and the left-turning direction as in step 1, and causes the traffic light 120B to be changed to a yellow signal. In step 2*a*, the red signal light 203A, the left-turn arrow signal light 221A, and the straight arrow signal light 222A are turned on at the traffic light 120A, and the yellow signal light 202B is turned on at the traffic light 120B.

Thereafter, in step 2*b*, the traffic light control unit 114 allows passage at the traffic light 120A in the right-turning direction in addition to the straight-traveling direction and the left-turning direction, and turns the traffic light 120B to red. In step 2*b*, the red signal light 203A, the left-turn arrow signal light 221A, the straight arrow signal light 222A, and the right-turn arrow signal light 223A are turned on at the traffic light 120A, and the red signal light 203B is turned on at the traffic light 120B. In step 2*b*, the oncoming straight-traveling vehicle cannot enter the intersection 200 from the road 260, and the right-turning vehicle on the road 250 can safely start turning right. In FIG. 6, the timing of transition from step 2*a* to step 2*b* corresponds to a start timing of the signal indication for facilitating the right turn. When the durations of steps 2*a* and 2*b* are respectively 3 seconds and t seconds (t>0), the duration of step 1 is shortened by (t+3) seconds. The maximum value of t seconds being the duration of step 2*b* is set according to the minimum duration of step 1.

Note that, in the above description, the example in which the signal control apparatus 110 facilitates the right turn from the road 250 to the road 280 has been described. However, the signal control apparatus 110 may facilitate the right turn from the road 260 to the road 270. In this case, the right-turning vehicle detection unit 111 may detect a vehicle present in the right-turning lane of the road 260 and a vehicle entering the right-turning lane from the image captured by the camera 130B. The oncoming vehicle information acquisition unit 112 may measure the flow of traffic of the oncoming vehicle present on the left turn/straight lane on the road 250 from the image captured by the camera 130A. The traffic light control unit 114 may allow traffic in the right-turning direction to proceed at the traffic light 120B, and prohibit traffic in the left-turning direction or the straight-traveling direction at the traffic light 120A, thereby performing the signal indication for facilitating the right turn from the road 260 to the road 270.

In the above description, the example of the signal indication for separating the right-turning vehicle from the straight-traveling vehicle and the left-turning vehicle has been described, but the present example embodiment is not limited thereto. The traffic light 120 may not have the left-turn arrow signal light and the straight arrow signal. For example, the traffic light control unit 114 may facilitate the right turn from the first direction side by turning the traffic light 120A to green while turning the traffic light 120B to red to prevent the inflow of a vehicle from the second direction side into the intersection 200. Alternatively, the traffic light control unit 114 may facilitate the right turn from the first direction side by turning on a right-turn arrow signal at the traffic light 120A while turning the traffic light 120B to red.

Figure 8:
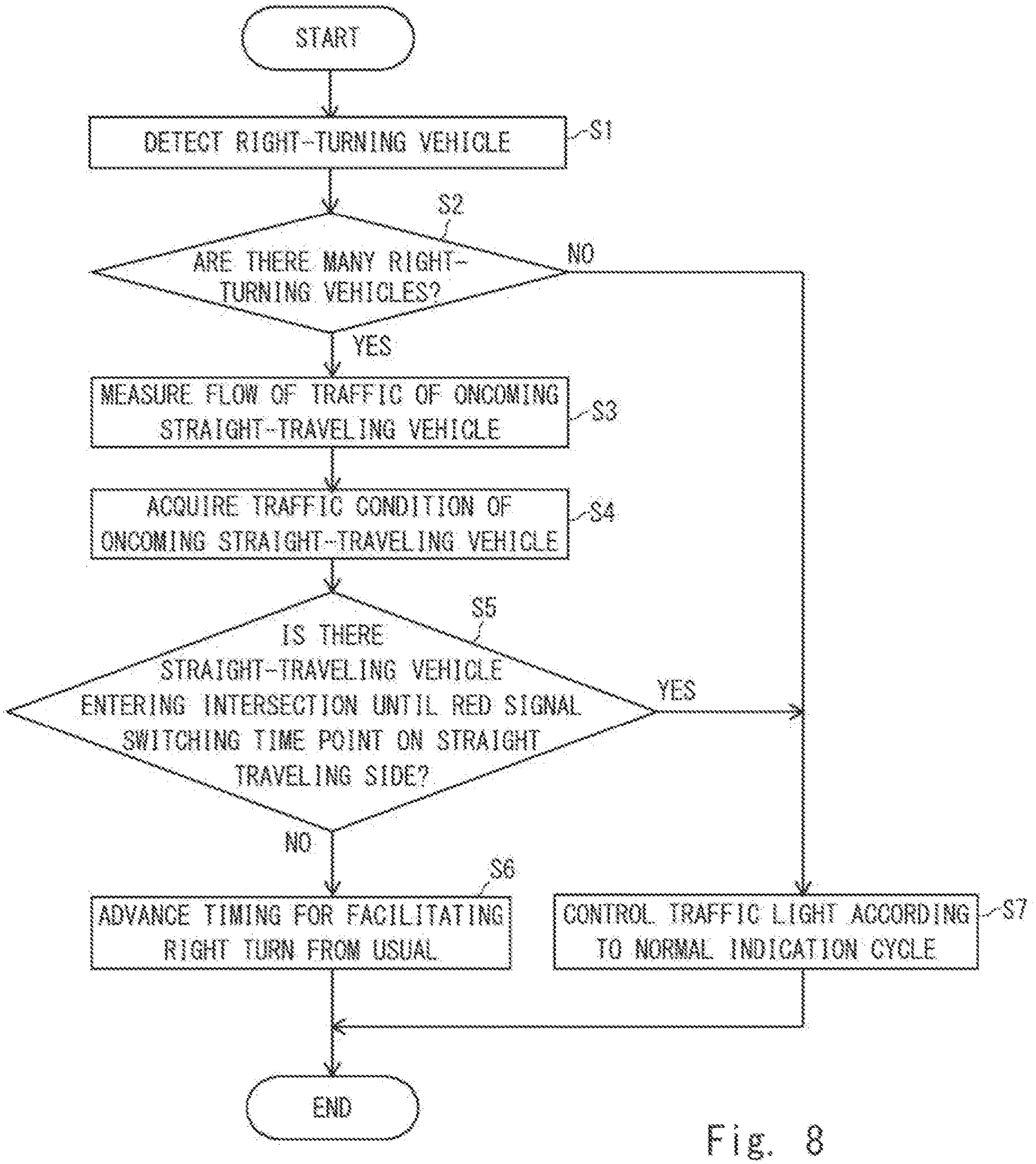
FIG. 8 is a flowchart illustrating an operation procedure in the signal control apparatus.

Next, an operation procedure will be described. FIG. 8 illustrates the operation procedure (signal control method) in the signal control apparatus 110. The right-turning vehicle detection unit 111 detects a right-turning vehicle on the road 250 (see FIG. 4) from the image captured by the camera 130A (step S1). In step S1, the right-turning vehicle detection unit 111 detects a vehicle present in the right-turning lane and a vehicle entering the right-turning lane as right-turning vehicles. The traffic light control unit 114 determines whether or not there are many right-turning vehicles (step S2). For example, when the number of detected right-turning vehicles exceeds a predetermined threshold value, the traffic light control unit 114 determines that there are many right-turning vehicles. When the number of detected right-turning vehicles is equal to or less than the predetermined threshold value, the traffic light control unit 114 determines that there are few right-turning vehicles. When it is determined in step S2 that there are few right-turning vehicles, the traffic light control unit 114 controls the traffic light 120 according to the normal signal indication cycle (step S7).

The oncoming vehicle information acquisition unit 112 measures the flow of traffic of oncoming vehicles on the road 260 from the image captured by the camera 130B (step S3). The traffic condition acquisition unit 113 acquires the traffic condition including the speed of the oncoming vehicle from the measurement of the measured flow of the traffic of the oncoming vehicle (step S4). In step S4, the traffic condition acquisition unit 113 predicts the intersection entry time point of each vehicle present in the monitoring target area 261 on the road 260, for example. The traffic light control unit 114 determines whether or not there is an oncoming vehicle entering the intersection 200 until a time point at which passage on the straight traveling side is not allowed in the normal signal indication cycle (step S5). Upon determining in step S5 that there is no such oncoming vehicle, the traffic light control unit 114 proceeds to step S7 and controls the traffic light 120 according to the normal signal indication cycle.

Upon determining in step S5 that there is no oncoming vehicle entering the intersection 200 until the time point at which the passage on the straight traveling side is not allowed in the normal signal indication cycle, the traffic light control unit 114 determines to advance the timing of the signal indication for facilitating the right turn. In this case, for example, the traffic light control unit 114 controls the traffic light 120A and the traffic light 120B according to the signal indication cycle illustrated in FIG. 6, thereby advancing the timing of the signal indication for facilitating the right turn from usual (step S6).

In the present example embodiment, the traffic light control unit 114 controls the timing of the signal indication for facilitating the right turn according to the traffic condition of the oncoming vehicle, which includes the speed. For example, when an oncoming vehicle is present at a position far from the intersection 200 and the speed of the oncoming vehicle is slow, it is considered that it takes time for the oncoming vehicle to enter the intersection 200. On the other hand, when an oncoming vehicle is present at a position far from the intersection 200 and the speed of the oncoming vehicle is high, it is considered that the oncoming vehicle enters the intersection 200 in a short time. The traffic light control unit 114 can control the traffic lights 120A and 120B in consideration of such a difference in traffic conditions. Therefore, the signal control apparatus 110 according to the present example embodiment can appropriately control the traffic lights 120A and 120B according to the traffic condition on the opposite lane side.

In particular, in the present example embodiment, the traffic condition acquisition unit 113 predicts the intersection entry time point of the oncoming straight-traveling vehicle. The traffic light control unit 114 compares the intersection entry time point of each oncoming straight-traveling vehicle with the predetermined timing at which the signal indication for facilitating the right turn is normally started, and determines whether or not there is an oncoming vehicle entering the intersection 200 from the opposite lane side until the predetermined timing. For example, when there are many right-turning vehicles and it is estimated that there is no oncoming vehicle entering the intersection 200 from the opposite lane side, the traffic light control unit 114 advances the timing of facilitating the right turn. In this manner, it is possible to shorten the waiting time for a right-turning vehicle to turn right and to suppress staying of the right-turning vehicles on the road passing through the intersection while minimizing the influence on the traffic on the oncoming straight line side when the timing not to allow passage on the oncoming straight line side is advanced.

Figure 9:
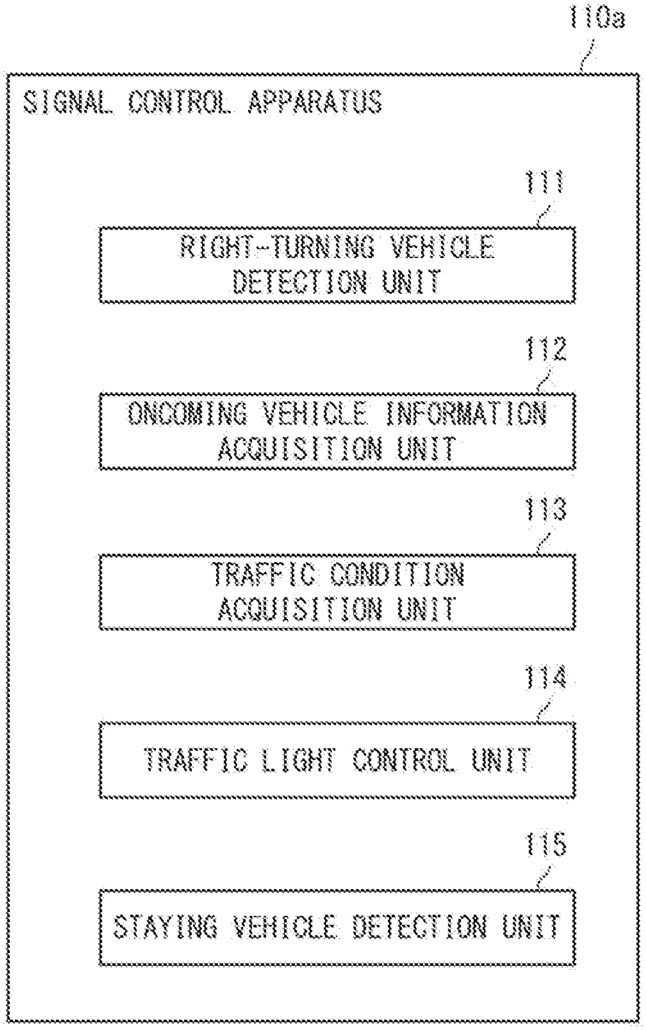
FIG. 9 is a block diagram illustrating an example of a configuration of a signal control apparatus used in a signal control system according to a second example embodiment of the present disclosure.

Next, a second example embodiment of the present disclosure will be described. FIG. 9 illustrates an example of a configuration of a signal control apparatus used in a signal control system according to the second example embodiment of the present disclosure. The configuration of the signal control system may be similar to the configuration of the signal control system 100 in the first example embodiment illustrated in FIG. 2. In the present example embodiment, a signal control apparatus 110*a* includes a staying vehicle detection unit 115 in addition to the configuration of the signal control apparatus 110 in the first example embodiment illustrated in FIG. 3.

The staying vehicle detection unit (third sensor) 115 detects a vehicle staying in the right-turning lane. The staying vehicle detection unit 115 detects, for example, a vehicle line length of a vehicle waiting for the right turn, which has been formed in the right-turning lane. The staying vehicle detection unit 115 may detect a vehicle staying in the right-turning lane by using, for example, the image captured by the camera 130A (see FIG. 2). Alternatively, the staying vehicle detection unit 115 may detect a vehicle staying in the right-turning lane by using an image captured by a camera different from the camera 130A. The staying vehicle detection unit 115 is configured as, for example, an AI sensor that receives an image as an input and outputs a detection result.

In the present example embodiment, the traffic light control unit 114 determines whether or not the vehicle stays in the right-turning lane based on the detection result of the staying vehicle detection unit 115. Upon determining that the vehicle is not staying in the right-turning lane, the traffic light control unit 114 shortens the duration of the signal indication for facilitating the right turn from the normal duration. For example, when there are few right-turning vehicles, the traffic light control unit 114 may shorten the duration of the signal indication for facilitating the right turn. Alternatively, when the right-turning vehicle is no longer staying in the right-turning lane, that is, when the line of vehicles waiting for the right turn is no longer present, the traffic light control unit 114 may shorten the duration of the signal indication for facilitating the right turn.

The traffic light control unit 114 may shorten the duration of the signal indication for facilitating the right turn by ending the signal indication for facilitating the right turn at a timing earlier than a predetermined timing at which the signal indication for facilitating the right turn is ended in the normal signal indication cycle. Specifically, the traffic light control unit 114 may set the duration of step 3 illustrated in FIG. 5 or 6 to a time shorter than 15 seconds. Alternatively, the traffic light control unit 114 may shorten the duration of the signal indication for facilitating the right turn by delaying the timing of starting the signal indication for facilitating the right turn. Specifically, upon determining that the vehicle is not staying in the right-turning lane, the traffic light control unit 114 may extend the duration of step 1 in FIG. 5 or 6 and shorten the duration of step 3 by the amount obtained by extending step 1.

In the present example embodiment, the traffic light control unit 114 adjusts the duration of the signal indication for facilitating the right turn according to the staying state of the right-turning vehicle in the right-turning lane. For example, when there are few right-turning vehicles, the traffic light control unit 114 shortens the time for turning on the right-turn arrow signal. When the time for turning on the right-turn arrow signal is shortened, the traffic light control unit 114 can extend the time for allowing passage in the straight-traveling direction and the left-turning direction on the roads 250 and 260 (see FIG. 4). Alternatively, the traffic light control unit 114 may extend the period of the green signal of the roads 270 and 280 intersecting the roads 250 and 260. When there are few right-turning vehicles, the time of the right-turn arrow signal is shortened, so that it is possible to allocate the shortened time to passage in other directions.

Note that in each of the above example embodiments, the example in which a lane dedicated to the right turn is provided at the intersection 200, and the right-turning vehicle detection unit 111 detects a vehicle or the like entering the lane has been described. However, the present disclosure is not limited to the above description. In each of the above example embodiments, the example in which the intersection 200 is a four-way road in which roads in four directions intersect each other has been described. However, the intersection 200 is not limited to a four-way road. The intersection 200 may be an intersection in which there is a road on which a vehicle that has entered the intersection from the first direction crosses the opposite lane and flows out. The intersection 200 may be a three-way intersection or an intersection in which five or more roads intersect.

Figure 10:
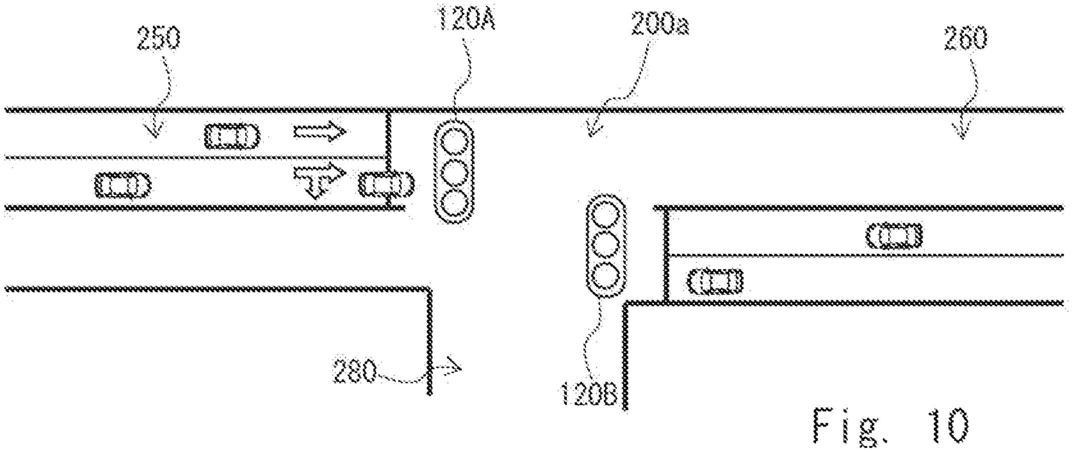
FIG. 10 is a plane schematically illustrating another example of an intersection where a traffic light is installed.

FIG. 10 illustrates another example of the intersection in which the traffic light 120 is installed. In the example illustrated in FIG. 10, an intersection 200*a* is a three-way road in which the roads 250 and 260 intersect with a road 280. In this example, the road 250 is provided with a lane dedicated to straight traveling and a lane capable of turning right and traveling straight. At the intersection 200*a*, the traffic light control unit 114 can facilitate the right turn from the road 250 to the road 280 by setting the period of the green signal at the traffic light 120A to be longer than the period of the green signal at the traffic light 120B.

In each of the above example embodiments, the description is omitted for simple description, but a traffic light for a pedestrian may be provided at the intersection 200. In this case, the traffic light control unit 114 may detect the number of pedestrians by using an image captured using a camera that captures an image of the vicinity of the intersection, and control an end timing of the display of the progressive light for the pedestrians according to the number of pedestrians. For example, when the number of pedestrians waiting for the traffic sign is smaller than a predetermined number, the traffic light control unit 114 may advance the end timing of the display of the progressive light at the traffic light for pedestrians from the normal timing.

In each of the above example embodiments, the first direction and the second direction can be switched as appropriate. In addition, the traffic light control unit 114 can perform signal control in third and fourth directions intersecting the first and second directions, in a similar manner to the signal control in the first and second directions. For example, the traffic light control unit 114 may control the timing of the signal indication for facilitating the right turn in a pair of traffic lights installed on the roads 270 and 280 illustrated in FIG. 4.

Figure 11:
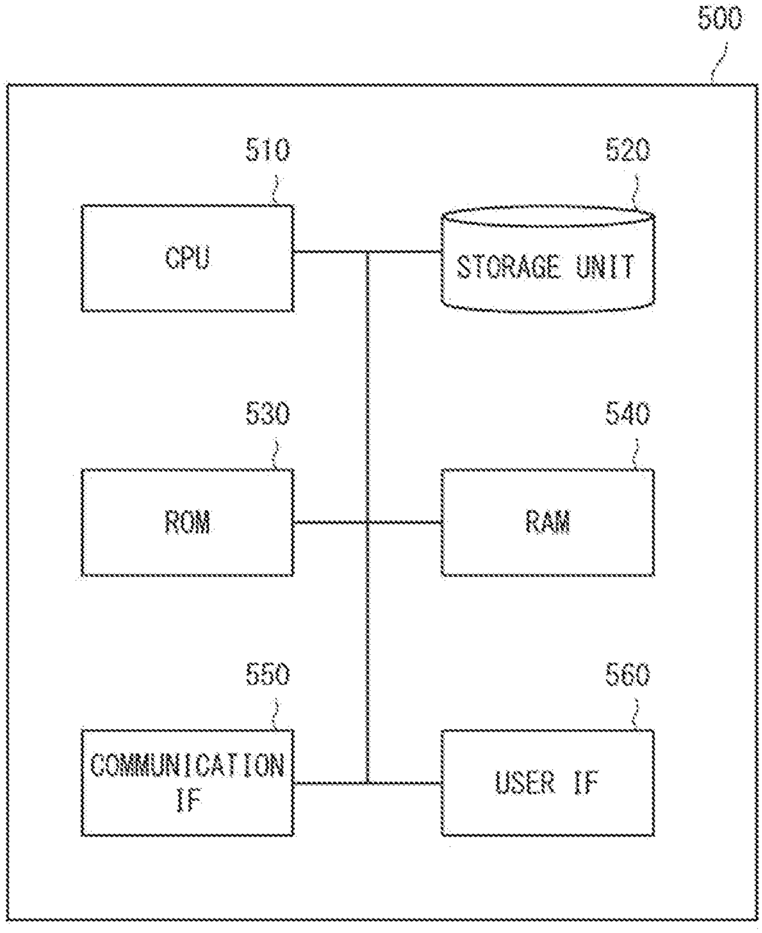
FIG. 11 is a block diagram illustrating an example of a configuration of a computer apparatus.

In each of the above example embodiments, the signal control apparatus 110 can be configured as a computer apparatus. FIG. 11 illustrates an example of a configuration of a computer apparatus that can be used as the signal control apparatus 110. A computer apparatus 500 includes a control unit (central processing unit (CPU)) 510, a storage unit 520, a read only memory (ROM) 530, a random access memory (RAM) 540, a communication interface (IF) 550, and a user interface 560.

The communication interface 550 is an interface for connecting the computer apparatus 500 to a communication network through wired communication means, wireless communication means, or the like. The user interface 560 includes, for example, a display unit such as a display. The user interface 560 also includes input units such as a keyboard, a mouse, and a touch panel.

The storage unit 520 is an auxiliary storage device that can hold various types of data. The storage unit 520 does not necessarily have to be a part of the computer apparatus 500, but may be an external storage device, or a cloud storage connected to the computer apparatus 500 via a network.

The ROM 530 is a non-volatile storage device. For example, a semiconductor storage device such as a flash memory having a relatively small capacity can be used for the ROM 530. Programs that are executed by the CPU 510 can be stored in the storage unit 520 or ROM 530. The storage unit 520 or the ROM 530 stores, for example, various programs for implementing the function of each unit in the signal control apparatus 110.

The program described above includes a group of commands (or software code) for causing a computer to perform one or more functions described in the example embodiments when being read by the computer. The program may be stored in a non-transitory computer-readable medium or a tangible storage medium. As an example and not by way of limitation, a computer-readable medium or tangible storage medium includes a RAM, a ROM, a flash memory, a solid-state drive (SSD) or other memory technology, a compact disc (CD)-ROM, a digital versatile disc (DVD), a Blu-ray (registered trademark) disk or other optical disk storage, a magnetic cassette, a magnetic tape, a magnetic disk storage, or other magnetic storage devices. The program may be transmitted on a transitory computer-readable medium or a communication medium. As an example and not by way of limitation, the transitory computer-readable medium or the communication medium includes electrical, optical, acoustic, signals, or propagated signals in other forms.

The RAM 540 is a volatile storage device. As the RAM 540, various types of semiconductor memory devices such as a DRAM (Dynamic Random Access Memory) or an SRAM (Static Random Access Memory) can be used. The RAM 540 can be used as an internal buffer for temporarily storing data and the like. The CPU 510 expands a program stored in the storage unit 520 or the ROM 530 in the RAM 540, and executes the expanded program. The function of each unit in the signal control apparatus 110 can be implemented by having the CPU 510 execute a program. The CPU 510 may include an internal buffer in which data and the like can be temporarily stored.

Although example embodiments according to the present disclosure have been described above in detail, the present disclosure is not limited to the above-described example embodiments, and the present disclosure also includes those that are obtained by making changes or modifications to the above-described example embodiments without departing from the spirit of the present disclosure.

The whole or part of the example embodiments disclosed above can be described as, but not limited to, the following Supplementary notes.

[Supplementary Note 1]

A signal control apparatus including:

a first sensor configured to detect a vehicle present in a lane in which a vehicle entering an intersection at which a traffic light is installed from a first direction is able to cross an opposite lane and turn right or left, and a vehicle entering the lane;

a second sensor configured to measure a flow of traffic of an oncoming vehicle that travels in an opposite lane from a second direction opposite to the first direction, enters the intersection, and passes through the intersection;

traffic condition acquisition means for acquiring a traffic condition including a speed of the oncoming vehicle based on sensor information obtained from the second sensor; and traffic light control means for controlling signal indications of first and second traffic lights which control traffic of vehicles entering the intersection from the first direction and the second direction, in which the signal indication includes a signal indication for facilitating the right turn or the left turn, and the traffic light control means controls a timing of the signal indication for facilitating the right turn or the left turn based on sensor information obtained from the first sensor and the traffic condition.

[Supplementary Note 2]

The signal control apparatus according to Supplementary note 1, in which the traffic light control means performs the signal indication for facilitating the right turn or the left turn by allowing traffic in a direction of the right turn or the left turn to proceed at the first traffic light and prohibiting travel in a left turning direction, a right turning direction, and a straight-traveling direction at the second traffic light.

[Supplementary Note 3]

The signal control apparatus according to Supplementary note 1 or 2, in which the traffic light control means performs the signal indication for facilitating the right turn or the left turn by turning on a right turn arrow signal or a left turn arrow signal at the first traffic light, and turning on a red signal at the second traffic light.

[Supplementary Note 4]

The signal control apparatus according to any one of Supplementary notes 1 to 3, in which the traffic light control means allows traffic in a direction of traveling straight through the intersection to proceed at the first traffic light in at least a part of a period in which the signal indication for facilitating the right turn or the left turn is performed.

[Supplementary Note 5]

The signal control apparatus according to any one of Supplementary notes 1 to 4, in which the traffic light control means performs a time difference indication between the first direction and the second direction in the signal indication for facilitating the right turn or the left turn.

[Supplementary Note 6]

The signal control apparatus according to any one of Supplementary notes 1 to 5, in which the traffic condition acquisition means acquires, as the traffic condition, an intersection entry time indicating a time until the oncoming vehicle reaches the intersection.

[Supplementary Note 7]

The signal control apparatus according to Supplementary note 6, in which the traffic condition acquisition means predicts an intersection entry time point at which the oncoming vehicle enters the intersection based on the intersection entry time, and the traffic light control means controls a timing of the signal indication for facilitating the right turn or the left turn in accordance with the predicted intersection entry time point and a time point corresponding to a predetermined timing for starting the signal indication for facilitating the right turn or the left turn in a signal indication cycle.

[Supplementary Note 8]

The signal control apparatus according to Supplementary note 7, in which the traffic light control means determines, based on the predicted intersection entry time point, whether or not there is an oncoming vehicle entering the intersection from the second direction for a period until the time point corresponding to the predetermined timing, and starts the signal indication for facilitating the right turn or the left turn at a timing earlier than the predetermined timing upon determining that there is no oncoming vehicle.

[Supplementary Note 9]

The signal control apparatus according to any one of Supplementary notes 6 to 8, in which the second sensor measures a position and the speed of the oncoming vehicle, and the traffic condition acquisition means calculates the intersection entry time based on the speed of the oncoming vehicle and a distance from the oncoming vehicle to the intersection.

[Supplementary Note 10]

The signal control apparatus according to any one of Supplementary notes 1 to 9, in which the traffic light control means controls the timing of the signal indication for facilitating the right turn or the left turn without changing an overall time of a signal indication cycle.

[Supplementary Note 11]

The signal control apparatus according to any one of Supplementary notes 1 to 10, in which the first sensor detects a vehicle present in a lane in which the vehicle is able to turn right or left, and a vehicle entering the lane from images acquired from one or more first image capturing devices configured to capture an image of the lane.

[Supplementary Note 12]

The signal control apparatus according to any one of Supplementary notes 1 to 11, in which the second sensor measures the flow of the traffic of the oncoming vehicle from an image acquired from a second image capturing device configured to capture an image of an upstream side of the intersection of the opposite lane.

[Supplementary Note 13]

The signal control apparatus according to any one of Supplementary notes 1 to 12, further including a third sensor configured to detect a vehicle staying in the lane, in which the traffic light control means determines whether or not a vehicle stays in the lane based on a detection result of the third sensor, and shortens a duration of the signal indication for facilitating the right turn or the left turn when it is determined that the vehicle does not stay in the lane.

[Supplementary Note 14]

The signal control apparatus according to Supplementary note 13, in which the third sensor detects a vehicle line length formed in the lane.

[Supplementary Note 15]

A signal control system including:

a first traffic light configured to control traffic of a vehicle entering an intersection from a first direction;

a second traffic light configured to control traffic of a vehicle entering the intersection from a second direction opposite to the first direction; and a signal control apparatus configured to control the first traffic light and the second traffic light, in which the signal control apparatus includes a first sensor configured to detect a vehicle present in a lane in which a vehicle entering an intersection from the first direction is able to cross an opposite lane and turn right or left, and a vehicle entering the lane, a second sensor configured to measure a flow of traffic of an oncoming vehicle that travels in an opposite lane from the second direction, enters the intersection, and passes through the intersection, traffic condition acquisition means for acquiring a traffic condition including a speed of the oncoming vehicle based on sensor information obtained from the second sensor, and traffic light control means for controlling signal indications of the first traffic light and the second traffic light, the signal indication includes a signal indication for facilitating the right turn or the left turn, and the traffic light control means controls a timing of the signal indication for facilitating the right turn or the left turn based on sensor information obtained from the first sensor and the traffic condition.

[Supplementary Note 16]

The signal control system according to Supplementary note 15, in which the traffic light control means performs the signal indication for facilitating the right turn or the left turn by allowing traffic in a direction of the right turn or the left turn at the intersection to proceed at the first traffic light and prohibiting travel in a direction of traveling straight through the intersection at the second traffic light.

[Supplementary Note 17]

The signal control system according to Supplementary note 15 or 16, in which the traffic condition acquisition means acquires, as the traffic condition, an intersection entry time indicating a time until the oncoming vehicle reaches the intersection.

[Supplementary Note 18]

The signal control system according to Supplementary note 17, in which the traffic condition acquisition means predicts an intersection entry time point at which the oncoming vehicle enters the intersection based on the intersection entry time, and the traffic light control means controls a timing of the signal indication for facilitating the right turn or the left turn in accordance with the predicted intersection entry time point and a time point corresponding to a predetermined timing for starting the signal indication for facilitating the right turn or the left turn in a signal indication cycle.

[Supplementary Note 19]

A signal control method including:

detecting a vehicle present in a lane in which a vehicle entering an intersection at which a traffic light is installed from a first direction is able to cross an opposite lane and turn right or left, and a vehicle entering the lane;

measuring a flow of traffic of an oncoming vehicle that travels in the opposite lane from a second direction opposite to the first direction, enters the intersection, and passes through the intersection;

acquiring a traffic condition including a speed of the oncoming vehicle based on the measured flow of the traffic of the oncoming vehicle; and controlling a timing of a signal indication for facilitating the right turn or the left turn in controlling signal indications of first and second traffic lights configured to control traffic of vehicles entering the intersection from the first direction and the second direction, based on detection results of the vehicle present in the lane and the vehicle entering the lane and the acquired traffic condition.

[Supplementary Note 20]

A non-transitory computer-readable medium storing a program for causing a computer to execute a process including:

detecting a vehicle present in a lane in which a vehicle entering an intersection at which a traffic light is installed from a first direction is able to cross an opposite lane and turn right or left, and a vehicle entering the lane;

measuring a flow of traffic of an oncoming vehicle that travels in the opposite lane from a second direction opposite to the first direction, enters the intersection, and passes through the intersection;

acquiring a traffic condition including a speed of the oncoming vehicle based on the measured flow of the traffic of the oncoming vehicle; and controlling a timing of a signal indication for facilitating the right turn or the left turn in controlling signal indications of first and second traffic lights configured to control traffic of vehicles entering the intersection from the first direction and the second direction, based on detection results of the vehicle present in the lane and the vehicle entering the lane and the acquired traffic condition.

REFERENCE SIGNS LIST

10 SIGNAL CONTROL SYSTEM
20 SIGNAL CONTROL APPARATUS
21 FIRST SENSOR
22 SECOND SENSOR
23 TRAFFIC CONDITION ACQUISITION MEANS
24 TRAFFIC LIGHT CONTROL MEANS
25 FIRST TRAFFIC LIGHT
30 SECOND TRAFFIC LIGHT
100 SIGNAL CONTROL SYSTEM
110 SIGNAL CONTROL APPARATUS
111 RIGHT-TURNING VEHICLE DETECTION UNIT
112 ONCOMING VEHICLE INFORMATION ACQUISITION UNIT
113 TRAFFIC CONDITION ACQUISITION UNIT
114 TRAFFIC LIGHT CONTROL UNIT
115 STAYING VEHICLE DETECTION UNIT
120A, 120B TRAFFIC LIGHT
130A, 130B CAMERA
200 INTERSECTION
201A, 201B GREEN SIGNAL LIGHT
202A, 202B YELLOW SIGNAL LIGHT
203A, 203B RED SIGNAL LIGHT
221A, 221B LEFT-TURN ARROW SIGNAL LIGHT
222A, 222B STRAIGHT ARROW SIGNAL LIGHT
223A, 223B RIGHT-TURN ARROW SIGNAL LIGHT
250-280 ROAD
251 RIGHT-TURNING LANE AREA
261 MONITORING TARGET AREA

The invention claimed is:

1. A signal control apparatus comprising:

a memory storing instructions; and at least one processor configured to execute the instructions to:

detect a vehicle present in a lane from which a vehicle entering an intersection at which a traffic light is installed from a first direction crosses an opposite lane and turns left, and a vehicle entering the lane;

measure a flow of traffic of an oncoming vehicle that travels in an opposite lane from a second direction opposite to the first direction, enters the intersection, and passes through the intersection;

acquire a traffic condition comprising a speed of the oncoming vehicle based on information obtained from the measured flow of the traffic of the oncoming vehicle;

acquire an intersection entry time indicating a time until the oncoming vehicle reaches the intersection;

predict an intersection entry time point at which the oncoming vehicle enters the intersection based on the intersection entry time; and control signal indications of a first traffic light and a second traffic light which control traffic of vehicles entering the intersection from the first direction and the second direction, respectively, wherein the signal indication comprises a signal indication for facilitating the left turn, and the at least one processor is configured to:

execute the instructions to control a timing of the signal indication for facilitating the left turn based on the predicted intersection entry time point and a time point corresponding to a predetermined timing for starting the signal indication for facilitating the left turn in a signal indication cycle;

determine, based on the predicted intersection entry time point, whether or not the oncoming vehicle enters the intersection until a time point at which passage on the straight traveling side is not allowed; and in a case where it is determined that the oncoming vehicle does not enter the intersection until the time point at which passage on the straight traveling side is not allowed, determine to advance the timing of the signal indication for facilitating the left turn.

2. The signal control apparatus according to claim 1, wherein the at least one processor is configured to execute the instructions to perform the signal indication for facilitating the left turn by allowing traffic in a direction of the left turn to proceed at the first traffic light and prohibiting travel in a right-turning direction and a straight-traveling direction at the second traffic light.

3. The signal control apparatus according to claim 1, wherein the at least one processor is configured to execute the instructions to perform the signal indication for facilitating the left turn by turning on a left-turn arrow signal at the first traffic light, and turning on a red signal at the second traffic light.

4. The signal control apparatus according to claim 1, wherein the at least one processor is configured to execute the instructions to allow traffic in a direction of traveling straight through the intersection to proceed at the first traffic light in at least a part of a period in which the signal indication for facilitating the left turn is performed.

5. The signal control apparatus according to claim 1, wherein the at least one processor is configured to execute the instructions to perform a time difference indication between the first direction and the second direction in the signal indication for facilitating the left turn.

6. The signal control apparatus according to claim 1, wherein the at least one processor is configured to execute the instructions to determine, based on the predicted intersection entry time point, whether or not there is a second oncoming vehicle entering the intersection from the second direction for a period until the time point corresponding to the predetermined timing, and start the signal indication for facilitating the left turn at a timing earlier than the predetermined timing upon determining that there is no oncoming vehicle.

7. The signal control apparatus according to claim 1, wherein the at least one processor is configured to execute the instructions to:

measure a position and the speed of the oncoming vehicle, and calculate the intersection entry time based on the speed of the oncoming vehicle and a distance from the oncoming vehicle to the intersection.

8. The signal control apparatus according to claim 1, wherein the traffic light control means controls the timing of the signal indication for facilitating the left turn without changing an overall time of the signal indication cycle.

9. The signal control apparatus according to claim 1, wherein the at least one processor is configured to execute the instructions to detect the vehicle present in the lane from which the vehicle turns left, and the vehicle entering the lane from images acquired from one or more first image capturing devices configured to capture an image of the lane.

10. The signal control apparatus according to claim 1, wherein the at least one processor is configured to execute the instructions to measure the flow of the traffic of the oncoming vehicle from an image acquired from a second image capturing device configured to capture an image of an upstream side of the intersection of the opposite lane.

11. The signal control apparatus according to claim 1, wherein the at least one processor is further configured to execute the instructions to:

detect a vehicle staying in the lane, and determine whether or not a vehicle stays in the lane based on a detection result of the vehicle staying in the lane, and shorten a duration of the signal indication for facilitating the left turn when it is determined that the vehicle does not stay in the lane.

12. The signal control apparatus according to claim 11, wherein the at least one processor is configured to execute the instructions to detect a vehicle line length formed in the lane.

13. A signal control system comprising:

the first traffic light configured to control traffic of a vehicle entering the intersection from the first direction;

the second traffic light configured to control traffic of a vehicle entering the intersection from the second direction opposite to the first direction; and the signal control apparatus according to claim 1.

14. The signal control system according to claim 13, wherein the at least one processor is configured to execute the instructions to perform the signal indication for facilitating the left turn by allowing traffic in a direction of the left turn at the intersection to proceed at the first traffic light and prohibiting travel in a direction of traveling straight through the intersection at the second traffic light.

15. A signal control method comprising:

detecting a vehicle present in a lane from which a vehicle entering an intersection at which a traffic light is installed from a first direction crosses an opposite lane and turns left, and a vehicle entering the lane;

measuring a flow of traffic of an oncoming vehicle that travels in the opposite lane from a second direction opposite to the first direction, enters the intersection, and passes through the intersection;

acquiring a traffic condition comprising a speed of the oncoming vehicle based on the measured flow of the traffic of the oncoming vehicle;

acquiring an intersection entry time indicating a time until the oncoming vehicle reaches the intersection;

predicting an intersection entry time point at which the oncoming vehicle enters the intersection based on the intersection entry time;

controlling a timing of a signal indication for facilitating the left turn-in controlling signal indications of a first traffic light and a second traffic light configured to control traffic of vehicles entering the intersection from the first direction and the second direction, respectively, based on the predicted intersection entry time point and a time point corresponding to a predetermined timing for starting the signal indication for facilitating the left turn in a signal indication cycle;

determining, based on the predicted intersection entry time point, whether or not the oncoming vehicle enters the intersection until a time point at which passage on the straight traveling side is not allowed; and determining, in a case where it is determined that the oncoming vehicle does not enter the intersection until the time point at which passage on the straight traveling side is not allowed, to advance the timing of the signal indication for facilitating the left turn.

16. A non-transitory computer-readable medium storing a program for causing a computer to execute a process comprising:

detecting a vehicle present in a lane from which a vehicle entering an intersection at which a traffic light is installed from a first direction crosses an opposite lane and turns left, and a vehicle entering the lane;

measuring a flow of traffic of an oncoming vehicle that travels in the opposite lane from a second direction opposite to the first direction, enters the intersection, and passes through the intersection;

acquiring a traffic condition comprising a speed of the oncoming vehicle based on the measured flow of the traffic of the oncoming vehicle;

acquiring an intersection entry time indicating a time until the oncoming vehicle reaches the intersection;

predicting an intersection entry time point at which the oncoming vehicle enters the intersection based on the intersection entry time;

controlling a timing of a signal indication for facilitating the left turn in controlling signal indications of a first traffic light and a second traffic light configured to control traffic of vehicles entering the intersection from the first direction and the second direction, respectively, based on the predicted intersection entry time point and a time point corresponding to a predetermined timing for starting the signal indication for facilitating the left turn in a signal indication cycle;

determining, based on the predicted intersection entry time point, whether or not the oncoming vehicle enters the intersection until a time point at which passage on the straight traveling side is not allowed; and determining, in a case where it is determined that the oncoming vehicle does not enter the intersection until the time point at which passage on the straight traveling side is not allowed, to advance the timing of the signal indication for facilitating the left turn.

* * * * *